United States Patent Office 3,423,281
Patented Jan. 21, 1969

3,423,281
COPOLYESTERS OF MIXED PHTHALIC ACIDS, ALIPHATIC DICARBOXYLIC ACIDS AND TETRAMETHYLENE GLYCOL
Maria V. Wiener, Akron, Ohio, assignor to The Goodyear Tire & Rubber Company, Akron, Ohio, a corporation of Ohio
No Drawing. Filed Mar. 10, 1964, Ser. No. 350,646
U.S. Cl. 161—226    4 Claims
Int. Cl. C08g *17/08;* C09j *3/16;* B32b *9/02*

This invention relates to new linear copolyesters. More particularly this invention relates to new random linear condensation polyesters having new and unusual properties and to the process of making them from tetramethylene glycol and free dicarboxylic acids.

Thermoplastic adhesives and coatings are known in the art. The materials of the prior art generally have low melting point, are amorphous, or have little crystallinity and are generally unsuitable for use as coatings which are exposed to relatively high temperatures.

It is an object of the present invention to provide novel thermoplastic copolyester resins which are relatively hard and are effective as adhesives to bond surfaces together. It is another object to provide laminates of the copolyesters. Another object of the invention is to provide electrical conductors coated with the copolyester resins. Another object is to provide new flexible self-sustaining films. A further object is to provide a process for the manufacture of copolyesters of tetramethylene glycol and dicarboxylic acids having a high degree of polymerization. Other objects will appear as the description of the invention proceeds.

According to the invention new random copolyester resins suitable for use in adhesive applications and in films and coatings are derived from tetramethylene glycol, terephthalic acid, isophthalic acid and an aliphatic acid in certain ratios. The molar proportions of the acid components of the copolyester resin are in the following ranges:

Terephthalate—65 to 75 mol percent,
Isophthalate—8 to 12 mol percent,
Aliphatic dicarboxylate—17 to 23 mol percent.

The following examples are given to illustrate the invention.

Example 1

A glass reaction vessel in the shape of a tube approximately 35 centimeters long having an inside diameter of 38 millimeters, equipped with a side arm, a nitrogen gas inlet tube and a stirrer was charged with 40 grams of tetramethylene glycol, 23.2 grams of terephthalic acid, 3.4 grams of isophthalic acid, 7.6 grams of technical grade azelaic acid and 0.100 gram of lead diacetate trihydrate. The mixture was stirred and heated by means of a vapor bath having a temperature of about 245° C. After one hour and 50 minutes heating at this temperature the reaction mixture was clear and the esterification reaction was complete as indicated by the collection of the theoretical amount of water liberated from the reactants. The pressure in the system was slowly reduced over one-half hour to one millimeter of mercury pressure. The mixture was then heated by means of a vapor bath having a temperature of 265° C. and the polycondensation reaction was carried out at this temperature and one millimeter of mercury pressure for two and one-half hours. The polymer obtained had an intrinsic viscosity of 0.672.

In a control run in which the lead catalyst was omitted esterification proceeded very slowly and the product formed by polycondensation was a low molecular weight polymer.

Example 2

0.7 mol of dimethyl terephthalate, 2.3 mols of tetramethylene glycol and 0.00165 mol of lead diacetate trihydrate were charged into a small reactor and heated by means of a vapor bath boiling at 245° C. until the ester interchange reaction was complete. 0.1 mol of isophthalic acid and 0.2 mol of sebacic acid were added to the reaction mixture. The pressure in the system was slowly reduced so that within 20 minutes the pressure was down to 120 millimeters of mercury pressure. The reaction was continued at this pressure at 245° C. bath temperature for one hour. Then the pressure in the system was reduced over a period of ten minutes to about one millimeter of mercury pressure and the heating vapor bath was replaced by another vapor bath boiling at 265° C. The polycondensation reaction was carried out at 265° C. and one millimeter of mercury pressure for approximately two and one-half hours. At this point the copolyester resin formed had an intrinsic viscosity of 0.8. Nitrogen was was then bled into the system and the mixture was maintained under nitrogen atmosphere while the pressure in the system was brought to atmospheric pressure. 0.06 weight percent of triphenylphosphite based on the weight of the polymer was added to the mixture. The pressure in the system was then again reduced to about one millimeter of mercury pressure and the reactants were further polymerized at 265° C. and one millimeter of mercury pressure for an additional 20 minutes.

Following the above-outlined procedure a highly polymeric copolyester of tetramethylene glycol, terephthalic acid, isophthalic acid and sebacic acid in which the terephthalic acid comprised 70 mol percent of the total acid units in the copolyester, the isophthalic acid units comprise 10 mol percent and the sebacic acid units comprise 20 mol percent of the total mols of acid units in the copolyester, having an intrinsic viscosity of 0.8 could be consistently produced.

Copolyester resin produced according to Example 2 was coated onto copper wire which already had a vinyl resin coating. The thus coated wire had excellent electrical properties. When the wire was bent around a two inch mandrel at —55° C. the coating did not crack, and it did not crack or break when the coated wire was aged 24 hours at 150° C., cooled and then bent around a mandrel which had a diameter three times the outside diameter of the wire. The coating had good resistance to burning and had excellent abrasion resistance.

In addition to being useful as coatings for electrical insulators, the copolyester resins of the present invention are also useful in adhesive applications. Thus the copolyester resins have been found to be especially useful in adhering leather to itself or to another material. For example, a shoe upper and insole assembled on a last and lasted by conventional procedures can be adhered together by heating a copolyester of the invention until it is molten, depositing a small amount of the molten material along the joint between the toe material and the insole of the shoe as a bead, spreading the molten resin thinly and pressing the insole against the overlasted upper material. When the resin cools and solidifies it will be observed that the insole is tightly and flatly adhered to the overlasted shoe. If desired, the insole or the overlasted upper after being lasted by the molten resin could be cooled and stored and at some later time the adhesive can be reactivated by heat and the insole applied as above.

The invention has been illustrated with respect to the preparation of certain of the copolyesters. Other copolyester resins within the scope of the invention can similarly be prepared, the ratios of the reactants being adjusted to regulate the composition of the polyester resin. The copolyester resins of the invention contain from 65 to 75 mol percent of terephthalate, 8 to 12 mol percent of isophthalate, the sum of the mol percent of terephthalate and isophthalate being from 77 to 83 mol percent and 17 to 23 mol percent of at least one aliphatic dicarboxylate, which contains from 6 to 12 carbon atoms in the linear chain of the aliphatic dicarboxylic acid unit. The chain may contain lower alkyl substituents. Representative examples of the aliphatic dicarboxylic acids that can be used are adipic, pimelic, suberic, azelaic, sebacic, dodecanedioic and 2,5-dimethyladipic, etc. The copolyester resins can be prepared by esterification reactions as indicated in Example 1. When they are made by esterification of the acids with tetramethylene glycol, soluble lead or a titanium containing catalyst are used. For example, soluble lead catalysts such as lead acetate, litharge, and soluble titanium catalysts such as the glycol titanates are used. Tetramethylene glycol cyclizes to form large amounts of tetrahydrofuran at elevated temperatures in the presence of materials such as zinc, magnesium and calcium containing materials. In addition, lead and titanium catalysts and mixtures of lead and titanium catalysts are preferred because they promote the formation of high polymeric copolyester in reasonable reaction times whereas many catalysts do not promote the formation of high molecular weight resins. Thus polyesters of tetramethylene glycol are prepared from free acids such as terephthalic acid, isophthalic acid or aliphatic dicarboxylic acid by reacting tetramethylene glycol with the appropriate free acid in the presence of soluble lead or titanium catalysts.

The condensation reactions are in general carried out in accordance with the usual known techniques. Thus, the reactions are preferably carried out in the absence of oxygen, generally in an atmosphere of inert gas such as nitrogen or the like, in order to lessen darkening. The condensation reaction of polytetramethylene dicarboxylates is carried out under reduced pressure, generally below ten millimeters of mercury pressure, and usually at or below one millimeter of mercury pressure at a temperature in the range of from about 250° to 270°, and preferably in the range of from 255° to 265° C. If desired, the condensation polymerization can be carried out according to the solid state method in which the polymer is polymerized to at least a low molecular weight polymer, usually to an intrinsic viscosity of at least 0.2, by the melt process, cooled and ground into small particles which are heated to a temperature below the sticking temperature of the polymer under reduced pressure or at atmospheric pressure, while an inert gas is passed over the polymer to remove volatile materials that are given off as the resin polymerizes. When the desired degree of polymerization is achieved the polymerization is stopped.

The preparation of the copolyesters from the acids is illustrated above. They can also be prepared by using the esters of the acids such as the methyl, ethyl, propyl, butyl and phenyl esters, if desired, using the soluble lead and titanium compounds as catalysts. The copolyester resins of the present invention have properties which make them highly desirable for the purposes indicated. Thus the copolyester resins have a relatively high elongation and a low glass transition temperature. The copolyester resins have low solubility in many of the common organic solvents. The resins crystallize rapidly and form strong flexible structures. They can be oriented if desired. They show good rseistance to ultraviolet light and do not melt below 150° C. They are useful in electric coating applications and as adhesive layers to form laminates.

The use of a copolyester of the invention as an adhesive was particularly illustrated with respect to applying the adhesive layer as a melt. Laminates can also be prepared by inserting a rod or film of the copolyester adhesives between the layers being laminated and heating and pressing the composite article. The adhesives may also be applied from solution and when this method is used a solution of the copolyester resin will be applied to one layer and most of the solvent evaporated before the structure is contacted with the second layer and the composite article heated and pressed. When a pre-formed film is used the film will be about one mil in thickness, although thicker or thinner layers may be used. Laminates are generally made by pre-heating the layer to be laminated to a temperature of from about the melting point of the resin being used to about 250° C. and then pressing the composite articles with the adhesive in place at pressure of up to about 3,000 p.s.i. pressure. The minimum temperature will depend on the particular copolyester used.

The use of the copolyesters was illustrated particularly with respect to laminating leather. The copolyesters of the invention adhere strongly to other substances and are excellent laminating adhesives to adhere various materials to a base. Thus the copolyesters can be used to laminate materials such as glass wood, paper, Mylar and metals, particularly iron, steel, chromium and copper.

Films are made from the copolyesters of the invention by techniques similar to those employed with other linear condensation polymers such as polyesters. Thus films can be made by melt extrusion or by casting film from a solution of copolyester. Films so made can be oriented in one or more directions. For some purposes it is desirable to stretch the film in only one direction, as for example in the preparation of ribbons and tapes for industrial application. Stretching in one direction is readily accomplished by such methods as winding a film from one roller to another, the second roller rotating at a higher peripheral speed than the first roller or by using a snubbing pin on the first roller to slow its speed of rotation. This stretching operation may be accomplished by methods familiar to those skilled in the art and is facilitated by warming the film or tape by some suitable means just prior to the actual stretching of the film.

For some purposes it is desirable to subject the film to biaxial orientation, e.g. by stretching the film in two directions at right angles to each other. Very useful film, which can be oriented or unoriented, as desired, can be made from copolyesters over the entire range of compositions.

The copolyesters will generally be used without further compounding, but they can be similarly compounded with other materials if desired. Compatible resins, elastomers, pigments, dyes, plasticizers and other compounding ingredients can be mixed with the copolyesters and the compounded copolyesters used in various applications.

While certain representative embodiments and details have been shown for the purpose of illustrating the invention it will be apparent to those skilled in the art that various changes and modifications may be made therein without departing from the spirit or scope of the invention.

What I claim is:

1. A random linear copolyester resin of tetramethylene glycol, terephthalic acid, isophthalic acid and an aliphatic dicarboxylic acid containing from 6 to 12 carbon atoms, the molar proportion of the acid components of said copolyester consisting of:

terephthalate—65 to 75 mol percent
isophthalate—8 to 12 mol percent the sum of the mol percents of terephthalate and isophthalate being from 77 to 83 mol percent and from 17 to 23 mol percent of aliphatic dicarboxylate which contains from 6 to 12 carbon atoms in the linear chain of the aliphatic dicarboxylic acid unit.

2. The copolyester of claim 1 in which the aliphatic dicarboxylate in the copolyester is derived from sebacic acid.

3. The copolyester of claim 1 in which the aliphatic dicarboxylate in the copolyester is derived from azelaic acid.

4. A laminate comprising a layer of leather adhered to a second layer by means of an intermediate layer of a copolyester of claim 1.

References Cited

UNITED STATES PATENTS

| | | | |
|---|---|---|---|
| 3,053,810 | 9/1962 | Griehl et al. | 260—75 |
| 3,013,914 | 12/1961 | Willard | 260—75 |

FOREIGN PATENTS

| | | |
|---|---|---|
| 766,290 | 1/1957 | Great Britain. |
| 588,833 | 6/1947 | Great Britain. |

WILLIAM H. SHORT, *Primary Examiner.*

M. GOLDSTEIN, *Assistant Examiner.*

U.S. Cl. X.R.

260—75; 117—75; 161—194, 214, 270, 231